US010108372B2

United States Patent
D'Eliseo et al.

(10) Patent No.: US 10,108,372 B2
(45) Date of Patent: Oct. 23, 2018

(54) METHODS AND APPARATUSES FOR EXECUTING A PLURALITY OF QUEUED TASKS IN A MEMORY

(71) Applicant: Micron Technology, Inc., Boise, ID (US)

(72) Inventors: Giuseppe D'Eliseo, Caserta (IT); Graziano Mirichigni, Vimercate (IT); Danilo Caraccio, Buonalbergo (IT); Luca Porzio, Casalnuovo di Napoli (IT); Antonino Pollio, Vico Equense (IT)

(73) Assignee: Micron Technology, Inc., Boise, ID (US)

( * ) Notice: Subject to any disclaimer, the term of this patent is extended or adjusted under 35 U.S.C. 154(b) by 85 days.

(21) Appl. No.: 14/605,593

(22) Filed: Jan. 26, 2015

(65) Prior Publication Data

US 2015/0212738 A1    Jul. 30, 2015

Related U.S. Application Data

(60) Provisional application No. 61/932,155, filed on Jan. 27, 2014.

(51) Int. Cl.
*G06F 3/06* (2006.01)
*G06F 12/00* (2006.01)

(52) U.S. Cl.
CPC .......... *G06F 3/0659* (2013.01); *G06F 3/0611* (2013.01); *G06F 3/0679* (2013.01); *G06F 12/00* (2013.01)

(58) Field of Classification Search
CPC .... G06F 3/0604; G06F 3/0673; G06F 3/0659; G06F 12/00; G06F 3/0611; G06F 3/0679
See application file for complete search history.

(56) References Cited

U.S. PATENT DOCUMENTS 5,469,548 A    11/1995   Callison et al.
5,504,868 A     4/1996   Krakirian
(Continued)

FOREIGN PATENT DOCUMENTS

| CN | 1732702 A | 2/2006 |
| WO | 2007076214 A2 | 7/2007 |
| WO | 2013111019 A2 | 8/2013 |

OTHER PUBLICATIONS

JEDEC Standard, Universal Flash Storage (UFS 1.1), JES2204A, Jun. 2012.*

(Continued)

*Primary Examiner* — Rocio Del Mar Perez-Velez
(74) *Attorney, Agent, or Firm* — Dorsey & Whitney LLP

(57) ABSTRACT

Methods and apparatuses are disclosed for executing a plurality of queued tasks in a memory. One example apparatus includes a memory configured to be coupled to a host. The memory is also configured to receive a plurality of memory access requests, a status request, and an execution command from the host, and to execute one or more of the plurality of memory access requests responsive to the execution command from the host. The execution command includes a plurality of respective indications that correspond to each respective memory access request of the plurality of memory access requests and that indicate whether the host is requesting the memory to execute each respective memory access request.

19 Claims, 5 Drawing Sheets

(56) References Cited

U.S. PATENT DOCUMENTS

| | | |
|---|---|---|
| 5,603,066 A | 2/1997 | Krakirian |
| 7,630,369 B1 | 12/2009 | Overby et al. |
| 7,644,205 B1 | 1/2010 | Overby |
| 8,176,232 B2 | 5/2012 | Tedrow et al. |
| 8,296,467 B2 | 10/2012 | Lee |
| 8,386,699 B2 | 2/2013 | Yeh |
| 8,423,722 B1 | 4/2013 | Deforest |
| 8,468,319 B1 | 6/2013 | Satran |
| 8,904,094 B2 | 12/2014 | Matsukawa et al. |
| 8,918,600 B2 | 12/2014 | Galbo et al. |
| 9,015,356 B2 | 4/2015 | Asnaashari et al. |
| 9,454,310 B2 | 9/2016 | Caraccio et al. |
| 9,824,004 B2 | 11/2017 | Mirichigni et al. |
| 2002/0009075 A1 | 1/2002 | Fesas, Jr. et al. |
| 2004/0127255 A1 | 7/2004 | Becker et al. |
| 2005/0114460 A1 | 5/2005 | Chen |
| 2006/0026342 A1 | 2/2006 | Calvignac et al. |
| 2006/0095686 A1 | 5/2006 | Miller |
| 2006/0179179 A1 | 8/2006 | Suzuoki |
| 2006/0271739 A1 | 11/2006 | Tsai et al. |
| 2006/0277349 A1 | 12/2006 | Murdock et al. |
| 2007/0016702 A1 | 1/2007 | Pione et al. |
| 2007/0226401 A1 | 9/2007 | Huang et al. |
| 2008/0040519 A1 | 2/2008 | Starr |
| 2008/0140972 A1 | 6/2008 | Kim et al. |
| 2008/0147893 A1 | 6/2008 | Marripudi |
| 2008/0162735 A1 | 7/2008 | Voigt |
| 2009/0089492 A1 | 4/2009 | Yoon et al. |
| 2009/0172286 A1 | 7/2009 | Lasser et al. |
| 2009/0228535 A1 | 9/2009 | Rathi |
| 2010/0115152 A1 | 5/2010 | Day et al. |
| 2010/0250785 A1 | 9/2010 | Shin et al. |
| 2010/0262721 A1 | 10/2010 | Asnaashari et al. |
| 2010/0262979 A1 | 10/2010 | Borchers |
| 2010/0312973 A1 | 12/2010 | Galbo et al. |
| 2011/0066837 A1 | 3/2011 | Lee |
| 2011/0161543 A1 | 6/2011 | van Holder et al. |
| 2011/0276725 A1 | 11/2011 | Yun |
| 2012/0011335 A1 | 1/2012 | Asnaashari et al. |
| 2012/0173792 A1 | 7/2012 | Lassa et al. |
| 2012/0179860 A1 | 7/2012 | Falanga et al. |
| 2012/0254520 A1 | 10/2012 | Roh et al. |
| 2012/0272114 A1 | 10/2012 | Cho et al. |
| 2012/0284587 A1 | 11/2012 | Yu |
| 2012/0324180 A1 | 12/2012 | Asnaashari et al. |
| 2013/0036339 A1 | 2/2013 | Shiraishi |
| 2013/0060981 A1 | 3/2013 | Horn |
| 2013/0067143 A1 | 3/2013 | Hasegawa et al. |
| 2013/0073795 A1 | 3/2013 | Hasegawa |
| 2013/0073797 A1* | 3/2013 | Chowdhury ....... G11C 16/3418 711/103 |
| 2013/0124932 A1 | 5/2013 | Schuh et al. |
| 2013/0145085 A1 | 6/2013 | Yu |
| 2013/0205073 A1 | 8/2013 | Hwang |
| 2013/0262745 A1 | 10/2013 | Lin |
| 2013/0301373 A1* | 11/2013 | Tam ...................... G11C 5/143 365/228 |
| 2013/0326141 A1 | 12/2013 | Marcu |
| 2014/0250262 A1 | 9/2014 | Buxton et al. |
| 2014/0281151 A1 | 9/2014 | Yu |
| 2014/0325519 A1 | 10/2014 | Li et al. |
| 2014/0351456 A1 | 11/2014 | Sharifie et al. |
| 2015/0033234 A1* | 1/2015 | Shacham .............. G06F 9/4843 718/102 |
| 2015/0074294 A1* | 3/2015 | Shacham ........... G06F 13/4243 710/5 |
| 2015/0100744 A1 | 4/2015 | Mirichigni |
| 2015/0154112 A1* | 6/2015 | Tuers .................. G06F 12/0246 714/773 |
| 2015/0160893 A1 | 6/2015 | Gorobets et al. |
| 2015/0199137 A1* | 7/2015 | Shin ...................... G06F 3/0611 711/103 |
| 2015/0234601 A1 | 8/2015 | Tsai et al. |
| 2016/0117102 A1* | 4/2016 | Hong .................. G06F 12/0246 711/103 |
| 2016/0364179 A1 | 12/2016 | Tsai et al. |
| 2018/0039572 A1 | 2/2018 | Mirichigni et al. |

OTHER PUBLICATIONS

Micron Technology, Inc., "e-MMC Memory for the Embedded World", http://www.micron.com/products/managed-nand/e-mmc, as accessed Aug. 28, 2013, 3 pgs.

Micron Technology, Inc., "TN-29-18: Booting from Embedded MMC Introduction", www.micron.com/~/media/Documents/Products/Technical%20Note/NAND%20Flash/tn2918.pdf, last revised Jun. 2008, 16 pgs.

Samsung, "eMMC Capacities up to 128GB", http://samsung.com/us/business/oem-solutions/pdfs/eMMC_Product%20Overview.pdf, printed Jun. 2012, 2 pgs.

\* cited by examiner

| BIT $i$, $i$=0 to 31 | STATUS |
|---|---|
| 0 | $i^{TH}$ REQUEST NOT READY FOR EXECUTION |
| 1 | $i^{TH}$ REQUEST READY FOR EXECUTION |

| BIT | 47:40 | 39:8 | 7:0 |
|---|---|---|---|
| CONTENT | HEADER | IDs OF REQUESTS TO BE EXECUTED | FOOTER |
| VALUE | -- | '0' OR '1' | -- |

METHODS AND APPARATUSES FOR EXECUTING A PLURALITY OF QUEUED TASKS IN A MEMORY

CROSS-REFERENCE TO RELATED APPLICATION

This application claims priority to a provisional application entitled "METHODS AND APPARATUSES FOR EXECUTING A PLURALITY OF QUEUED TASKS IN A MEMORY," filed on Jan. 27, 2014 and assigned Application No. 61/932,155. This application is incorporated by reference herein in its entirety and for all purposes.

BACKGROUND OF THE INVENTION

In an apparatus where data is to be transferred from a host to a memory, the data may be transferred in several different manners. In one example, the host may send a command to the memory (along with data to be written to the memory in the case of a write command) and the memory may execute the command without any further processing or other interaction from the host or memory. In order to accomplish this manner of data transfer, a number of different control signals may need to be provided from the host to the memory on dedicated signal lines—for example, a write enable signal, a read enable signal, an address latch enable signal, a command latch enable signal, a chip enable signal, and so forth may need to be generated by the host and provided to the memory.

In other examples, the number of control signals provided from the host to the memory (and therefore the number of signal lines between the host and the memory) may be reduced in order to simplify the interface between the host and the memory. In these examples, however, the memory may need to do additional processing on the commands and data received from the host in order to correctly read from or write to the memory. This manner of data transfer also allows multiple memory access requests to be sent from the host to the memory before one or more of those memory access requests are executed. The multiple memory access requests may be queued until the memory is ready to execute them, and the memory may provide ready status information to the host regarding the readiness of the memory to execute the queued memory access requests. This ready status information may be provided to the host by continuously sending the ready status information to the host in some examples, but such continuous transfer of ready status information (whether via continuous polling of the memory or via a dedicated signal line that triggers an interrupt or other action) may unnecessarily consume power and/or unnecessarily use signal lines.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
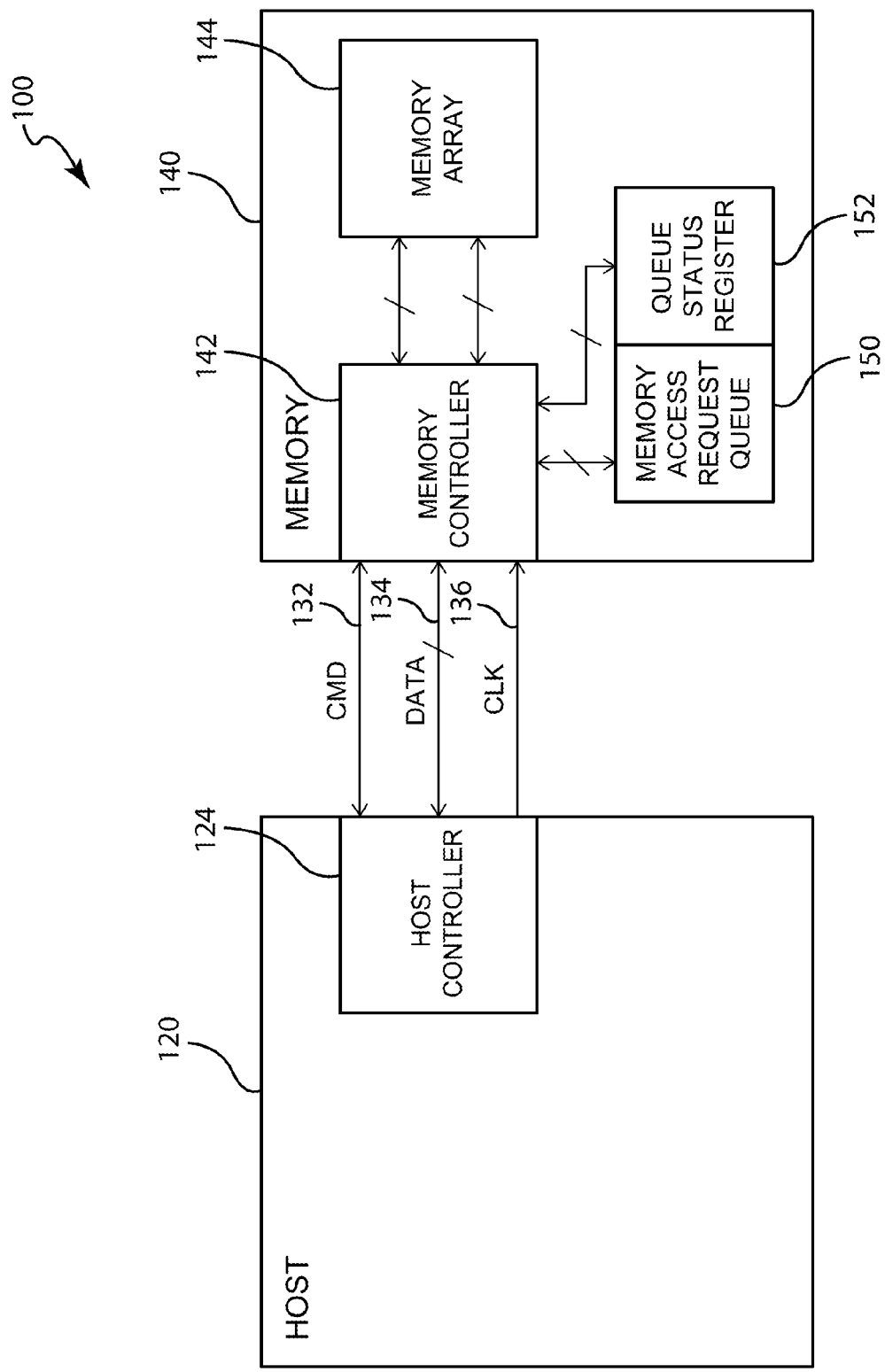
FIG. 1 is a block diagram of an apparatus with a host that can execute a plurality of queued tasks in a memory according to an embodiment of the present invention.

FIG. 1 illustrates an apparatus 100 with a host 120 coupled to a memory 140, according to an embodiment of the invention. As used herein, apparatus may refer to, for example, an integrated circuit, a memory device, a memory system, an electronic device or system, a smart phone, a tablet, a computer, a server, etc.

The host 120 includes a host controller 124, and is configured to provide (e.g., issue) commands to the memory 140, for example, a plurality of memory access requests. The memory access requests may be requests to read data from the memory 140, to write data into the memory 140, or otherwise access and potentially manipulate the data in the memory 140. In other words, a memory access request may correspond with a data transfer being requested, and in some embodiments may include parameters related to a direction (e.g., read, write) of the respective data transfer, a size of the respective data transfer, a priority of the respective data transfer, and/or an assigned request identification number of the respective data transfer.

The host 120 is further configured to provide commands such as status requests to the memory 140 in order to request ready status information from the memory 140 regarding whether the memory 140 is ready to execute the memory access requests previously provided to the memory 140. The ready status information may include an indication of whether the memory is ready to execute one or more of the plurality of memory access requests and may also include an indication of when the memory 140 may be ready to execute one or more of the plurality of memory access requests (if, for example, the memory 140 is not yet ready to execute one or more of the plurality of memory access requests). In some embodiments, the ready status information may indicate whether the memory 140 is ready to execute any one of the plurality of memory access requests, whether the memory is ready to execute multiples ones of the plurality of memory access requests, whether the memory is ready to execute all of the plurality of memory access requests, etc.

The host 120 is also configured to provide execution commands to the memory 140, responsive to the ready status information received from the memory 140, in order to request execution of one or more of the memory access requests that the memory 140 is ready to execute. In some embodiments, an execution command may be used to request the execution of a single memory access request. In other embodiments, a single execution command may be used to request execution of multiple ones of the memory access requests that the memory 140 is ready to execute. The execution command provided by the host 120 may include a plurality of respective indications that correspond to each memory access request that the host 120 has provided to the memory 140, each of which indicates whether the host 120 is requesting the memory 140 to execute the respective memory access request. By allowing the host 120 to provide a single execution command requesting execution of multiple memory access requests, fewer execution commands may be needed (thereby allowing for more efficient use of the CMD bus 132 and the DATA bus 134, which are described below).

The memory 140 includes a memory controller 142 coupled to at least one memory array 144, which may be a non-volatile (e.g., NAND flash, phase change material, etc.) memory array 144 in some embodiments. The controller 142 is configured to access the memory array 144 by executing memory access requests received from the host 120. In one embodiment, the memory controller 142 together with the memory array 144 together form an embedded multimedia card (eMMC). The eMMC may also include other components in some embodiments, such as additional hardware and firmware.

The memory 140 also includes a memory access request queue 150, and a queue status register 152 configured to indicate the status of the memory access requests in the memory access request queue 150. The memory 140 is configured to receive the plurality of memory access requests, status requests, and execution commands from the host 120. The memory 140 may also be configured to provide the ready status information to the host 120, responsive to the status requests, based on whether the memory 140 is ready to execute one or more of the plurality of memory access requests previously received from the host 120. The memory 140 may also be configured to provide an indication of when the memory 140 may be ready to execute one or more of the plurality of memory access requests in response to a status request, such as if the memory 140 is not ready to execute any of the plurality of memory access requests previously received from the host 120. The memory 140 may be configured to provide the ready status information to the host 120 by providing the host 120 with the contents of the queue status register 152.

The ready status information provided by the memory 140 to the host 120 may be embedded within a larger response to the status request in some embodiments. For example, the larger response may include an acknowledgment of receipt of the status request from the host 120, error checking information such as a cyclic redundancy check, and so forth.

The memory access request queue 150 is configured to queue one or more memory access requests received from the host 120. In some embodiments, a plurality (e.g., two, three, ten, twenty, thirty, etc.) of memory access requests may be provided from the host 120 to the memory 140 before the memory 140 executes one or more of the previously received memory access requests. The queue status register 152 may be configured to maintain an indication of readiness for execution corresponding to one or more of the plurality of memory access requests received from the host 120, for example, as described below with reference to FIG. 2B. In some embodiments, the queue status register 152 may maintain an indication of readiness for execution corresponding to each of the plurality of memory access requests received from the host 120.

The apparatus 100 in FIG. 1 also includes a CMD bus 132, a DATA bus 134, and a CLK signal line 136 coupled between the host 120 and the memory 140. In some embodiments, and with reference to FIG. 1, the CMD bus 132 may be a 1-bit wide serial bus that is bidirectional (e.g., can receive information from both the host 120 and the memory 140, with information received from one direction propagating towards the other direction). For example, the host 120 may be configured to provide commands—such as memory access requests, status requests, execution commands, and so forth—to the memory 140 via the CMD bus 132. Similarly, the memory 140 may be configured to provide the ready status information to the host 120 (responsive to the status requests from the host 120) via the CMD bus 132.

The DATA bus 134 may be several bits (e.g., 8 bits) wide in some embodiments, and may also be bidirectional. The host 120 may be configured to provide data (e.g., write data to be written to the memory 140) to the memory 140 via the DATA bus 134, and the memory 140 may be configured to provide data (e.g., read data that is read from the memory 140) to the host 120 via the DATA bus 134.

The CLK signal line 136 provides a reference clock from the host 120 to the memory 140, which may be used as a strobe signal to clock commands and/or data provided between the host 120 and the memory 140 on the CMD bus 132 and the DATA bus 134.

In some embodiments, the ready status information provided to the host 120 includes an indication of whether the memory 140 is ready to execute memory access requests received from the host 120 and queued in the memory access request queue 150. In some embodiments, the ready status information may be based on whether the DATA bus 134 is available for data transmission between the host 120 and the memory 140. In some embodiments, the ready status information provided to the host 120 may only be valid for a duration of time after it is provided by the memory 140, and/or may only be valid if there are no intervening commands or requests made of the memory 140. For example, ready status information indicating that a memory access request or several memory access requests are ready for execution may only be valid for 100 milliseconds, and may further become invalid if the host 120 provides an additional memory access request to the memory 140 that, for example, has a higher priority than the memory access requests currently pending in the memory access request queue 150.

Referring still to FIG. 1, in operation, the host 120 provides a plurality of memory access requests to the memory 140 by, for example, providing the memory access requests to the CMD bus 132. The memory 140 in turn receives the plurality of memory access requests from the host 120 via the CMD bus 132. In some embodiments, the host 120 may assign a request identification number to one or more of the plurality of memory access requests before providing the memory access requests to the memory 140. In other embodiments, however, the host 120 may provide memory access requests to the memory 140 without reference identification numbers, and the memory 140 may assign request identification numbers to the received memory access requests.

After the memory 140 receives one or more memory access requests from the host, the memory may prepare itself to execute the one or more memory access requests. The memory may prepare itself, for example, by inspecting the memory access requests already in the memory access request queue 150, performing error handling operations related to received memory access requests, ordering the memory access requests in order to improve performance of the memory during execution of those requests or in order to conform to priorities assigned to the requests by the host 120, updating the memory access request queue 150 and the queue status register 152 based on the newly received memory access request, and so forth.

After providing one or more memory access requests, the host 120 may provide a status request in order to request ready status information from the memory 140. In response to the status request from the host 120, the memory 140 provides the ready status information to the host 120 via the CMD bus 132. The ready status information may be indicative of whether the memory is ready to execute one or more of the plurality of memory access requests, and in some embodiments may include an estimated relative wait time before the memory may be ready to execute one or more of the plurality of memory access requests (e.g., if the memory is not yet ready to execute any of the plurality of memory access requests).

In some embodiments, separate ready status information (or separate indications within a single ready status information) may be provided for respective ones of a plurality of memory access requests provided to the memory 140. For example, for respective ones of the plurality of memory access requests, the ready status information may include an indication of whether the memory 140 is ready to execute that specific memory access request and/or an indication of when the memory may be able to execute that specific memory access request, with indications of whether the memory 140 is ready to execute another specific memory access request and when the memory may be able to execute that other specific memory access request being provided in separate ready status information, or provided in separate parts of a single ready status information. In some examples, separate indications may be provided for each respective memory status request, whereas in other embodiments separate indications may be provided only for different types of memory access requests (e.g., one indication for all reads, one indication for all writes, etc.), and in still other embodiments, one type of indication (e.g. whether the memory is ready) may be provided for each respective memory access request and one type of indication (e.g., when the memory will be ready to execute one or more memory access requests) is provided for the memory access requests collectively.

The host 120, after receiving ready status information from the memory 140 indicating that one or more requests are ready for execution, may provide an execution command to the memory responsive to that ready status information. The execution command may correspond to one or more of the memory access requests received from the host 120—for example, if the ready status information indicates that the memory access request that has been assigned request identification number 1 is ready to be executed by the memory 140, the host may request execution of that memory access request.

As mentioned above, in those embodiments where the execution command comprises a plurality of indications indicating whether the host is thereby requesting execution of each respective one of a plurality of different memory access requests, a single execution command may be used to request execution of multiple ones of the memory access requests. The multiple ones of the memory access requests that the host 120 requests to be executed may include some but not all of the memory access requests provided to the memory 140 in some embodiments. Further, in some embodiments, the execution command may be limited to a specific type of memory access (e.g., read or write), and the grouping of multiple memory access requests into a single execution command may be limited by the type of memory access. In other words, in some embodiments, only similar types of memory access requests (e.g., read or write) can be grouped together in a single execution command.

In some embodiments, when the execution of more than one memory access requests are included within a single execution command, the memory 140 may be configured to execute the multiple memory access requests in numerical order according to the respective request identification numbers assigned to the memory access requests. For example, if an execution command includes indications indicating that memory access requests 2, 4, 8, and 10 should be executed, the memory 140 may execute memory access request 2 first, memory access request 4 second, memory access request 8 third, and memory access request 10 last. Of course, in other embodiments, the memory 140 may be configured to execute the memory access requests in reverse numerical order.

In still other embodiments, the memory 140 may be configured to determine a suggested execution order for the memory access requests and provide the same to the host 120. The memory 140 may, for example, provide the suggested execution order to the host 120 together with the ready status information in response to receiving a status request from the host. In response to receiving the suggested execution order, the host 120 may be configured to provide an indication of whether the memory 140 should use the suggested execution order in executing the requested memory access requests.

In still other embodiments, the memory 140 may be configured to provide an actual execution order to the host 120, with the actual execution order indicating the order in which the memory will execute each of the plurality of memory access requests that the host 120 has requested be executed. In other words, the actual execution order may not just be 'suggested,' but may be the actual order in which the memory 140 will execute the memory access requests. The memory 140 may send this information to the host 120 so that the host can properly coordinate data being read from or written to the memory 140 with the queued memory access requests, in case the memory access requests are not executed in, for example, numerical order. In some embodiments, the memory 140 may send the actual execution order to the host 120 as part of an acknowledgment response to an execution command, or alternatively, the memory may send the actual execution order to the host 120 as part of a response to receiving a status request from the host 120.

In those embodiments where the memory 140 determines a suggested or actual execution order, the order may be based on the ability of the memory 140 to more quickly execute certain commands in a certain order. If, for example, the plurality of memory access requests are all read-type requests, and the addresses corresponding to two of the memory read access requests are close together, the memory 140 may be able to execute those two memory read access requests more quickly if done back-to-back, as opposed to having intervening memory read access requests with other addresses. Thus, allowing the memory 140 to suggest or set forth an execution order may result in improved performance of the apparatus 100.

In still other embodiments, the host 120 may be configured to determine a suggested execution order and to provide the suggested execution order to the memory 140. In these embodiments, the memory 140 may be configured to provide a response to the host indicating whether the suggested execution order will be used—which may for example be provided in an acknowledgment response to an execution command and/or to a status request. In still other embodiments, the host 120 may be configured to determine an actual execution order and to provide the same to the memory 140. In some embodiments, the host 120 may determine the suggested or actual execution order based on its understanding of the internal structure of the memory 140 and the addresses of the memory access requests that it has provided to the memory.

Figures 2A, 2B, 2C:
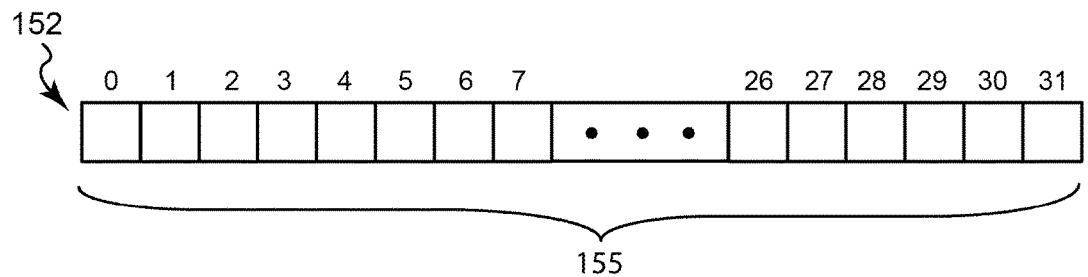
FIG. 2A is a block diagram of a queue status register according to an embodiment of the invention.
FIG. 2B is a table of different bit values for the queue status register of FIG. 2A and status information corresponding to those different bit values, according to an embodiment of the invention.
FIG. 2C is a table illustrating the structure and values for an execution command according to an embodiment of the invention.

FIG. 2A illustrates an embodiment of the queue status register 152 according to an embodiment of the invention. As illustrated in FIG. 2A, the queue status register 152 includes a collection of registers 155 configured to store indications of readiness corresponding to a plurality of memory access requests received by the memory 140. In some embodiments, the collection of registers 155 may be mapped one-to-one to pending memory access requests, with the bit position i in the queue status register 152 corresponding to a request identification number assigned to the respective request. The collections of registers 155 defines at least in part the queue status register 152, and holds ready status information relating to a plurality of memory access requests received by the memory 140.

FIG. 2B illustrates values that the bits in the first collection of registers 155 may take during operation of the queue status register 152. For example, the bit in the $0^{th}$ position of the queue status register 152 may store an indication that the memory access request that has been assigned a request identification number of 0 is or is not ready for execution. When the bit in the $0^{th}$ position is a logic low (e.g., 0), this may correspond to the $0^{th}$ memory access request not being ready for execution, whereas when the bit in the $0^{th}$ position is a logic high (e.g., 1), this may correspond to the $0^{th}$ memory access request being ready for execution. In this manner, the first collection of registers 155 in the queue status register 152 indicate which of the memory access requests received by the memory 140 are ready for execution.

FIG. 2C illustrates the structure and values of an execution command that may be provided from the host 120 to the memory 140. The execution command structure illustrated in FIG. 2C includes 48 bits, with a header in the most significant 8 bits, an argument containing the identification numbers of the memory access requests that the host 120 wants the memory 140 to execute in the middle, and a footer in the least significant 8 bits. The header and footer may include, for example, error correction information, a command type (e.g., read or write), starting and ending transmission bits, and so forth.

As illustrated in FIG. 2C, the argument of the execution command corresponding to the memory access requests that the host 120 wants the memory 140 to execute may be in a bitmap format, with each respective bit corresponding to a respective one of the plurality of memory access requests. For example, the bit in the least significant bit position of the argument (e.g., bit 8 in FIG. 2C) may correspond to a memory access request which has been assigned an identification number of 0, the bit in the next to least significant bit position (e.g., bit 9 in FIG. 2C) may correspond to a memory access request which has been assigned an identification number of 1, and so on. The value of each bit in the argument may correspond to whether or not the corresponding memory access request should be executed. For example, a logic high value (e.g., 1) may correspond to a request from the host 120 to execute the corresponding memory access request, while a logic low value (e.g., 0) may correspond to the host 120 not requesting the execution of the corresponding memory access request.

With reference still to FIG. 2C, the structure of the execution command may be such that the host 120 can request that one or multiple ones of memory access requests be executed by the memory 140. In other words, given the example above, if just one of the bits of the argument is set to a logic high value, the execution command corresponds to a request by the host 120 for the memory 140 to execute a single memory access request. If, on the other hand, multiple bits in the argument of the execution command are set to logic high values, then the execution command may correspond to a request by the host to execute multiple memory access requests without an intervening execution command.

Figure 3A:
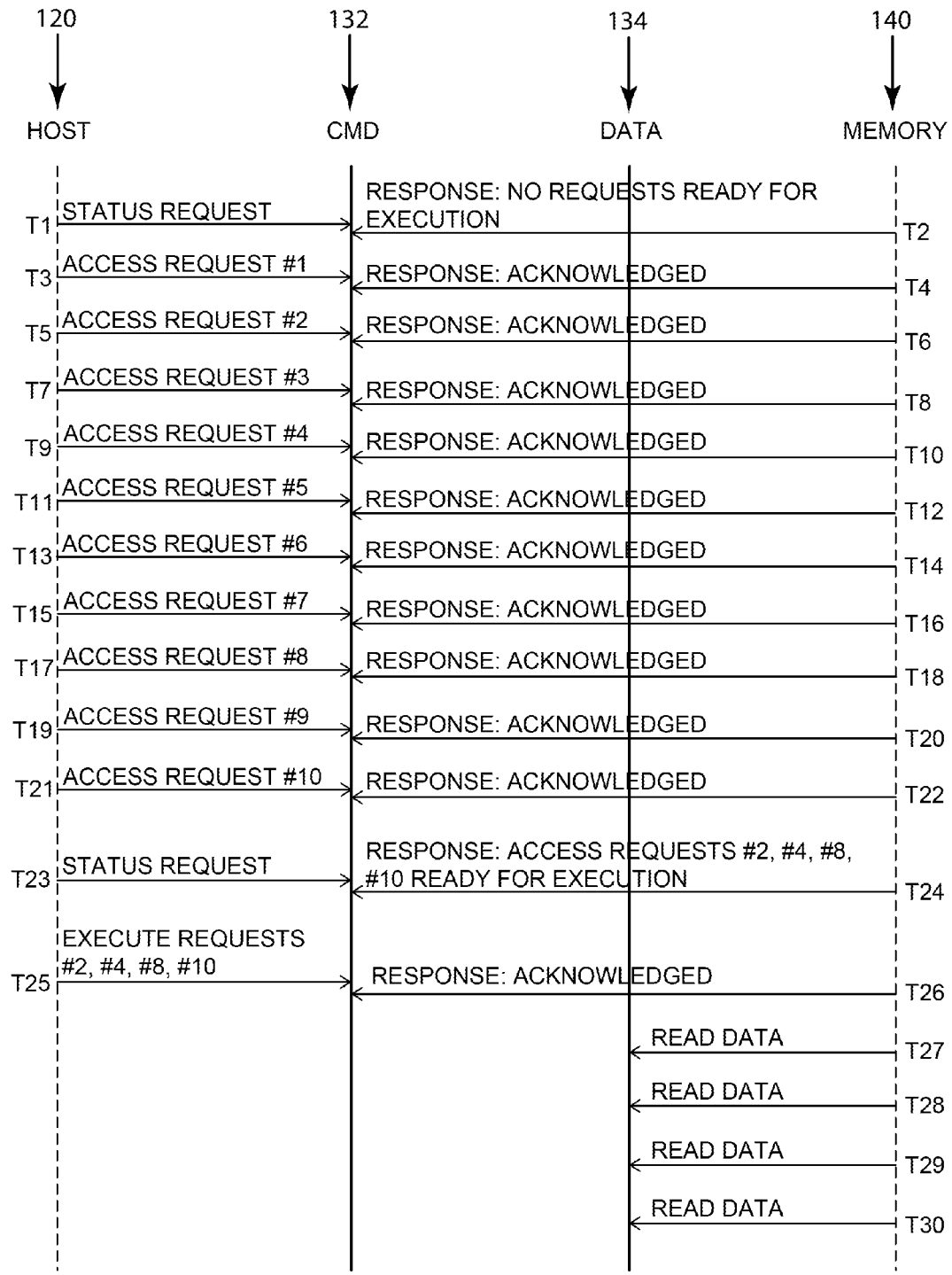
FIG. 3A is a timing diagram illustrating the operation of the apparatus of FIG. 1 according to an embodiment of the invention.

Referring now to FIG. 3A, one example of operation of the host 120 and memory 140 of FIG. 1, and the queue status register 152 of FIGS. 1 and 2A will be described. At time T1, the host 120 provides a status request to the memory 140 via the CMD bus 132 in order to request ready status information from the memory 140. At time T2, the memory responds to the status request by acknowledging receipt of the status request and providing the contents of the queue status register 150 to the host via the CMD bus 132. In this instance, because no memory access requests have been received by the memory 140, the response provided by the memory 140 is that no requests are ready for execution.

At time T3, the host 120 provides a first memory access request to the memory 140 via the CMD bus 132. The memory 140 responds at time T4 with an acknowledgment of receipt of the first access request. Upon receipt of the first memory access request, the memory controller 142 may initialize the indication of whether the memory 140 is ready to execute the first memory access request to "not ready for execution" by setting the corresponding bit in the queue status register 152 to a logic low. Further, the memory 140 may begin preparing itself to execute the first memory access request after receiving it so that it can change the indication of whether it is ready to execute the first memory access request after the preparations are complete.

Although FIG. 3A illustrates the first memory access request being provided by the host 120 as a single command, and a single response being provided by the memory 140, in some embodiments, memory access requests may be split into two different commands, which may cause the memory 140 to respond separately with two separate responses.

At time T5, the host 120 provides a second memory access request to the memory 140 via the CMD bus 132, and the memory 140 responds at time T6 with an acknowledgment of receipt of the second access request. At time T6, the memory has received a plurality of memory access requests, none of which have been executed yet. In some embodiments, when the memory 140 receives a new memory access request from the host 120, the memory 140 may reconsider the requests it has previously indicated as being ready or not ready for execution based on the priorities of the newly received memory access request and the previously received memory access requests. For example, if the newly received memory access request has a high priority whereas the previously received and still unexecuted memory access requests in the memory access request queue have low priorities, the memory 140 may revoke the readiness to execute those lower priority requests in order to prepare the memory 140 to execute the newly received high priority memory access request. In general, the memory access requests may, in some embodiments, become ready for execution based on respective priorities assigned by the host 120 to respective ones of the plurality of memory access requests.

At times T7, T9, T11, T13, T15, T17, T19, and T21, the host 120 provides additional memory access requests (memory access requests #3, #4, #5, #6, #7, #8, #9, and #10) to the memory 140, and the memory responds at times T8, T10, T12, T14, T16, T18, T20, and T22 with respective acknowledgment responses. At time T23, the host 120 provides a status request to the memory 140, and the memory 140 responds at time T24 by providing the contents of the queue status register 150 to the host 120 via the CMD bus 132. As illustrated in FIG. 3A, the contents of the queue status register 150 provided to the CMD bus 132 at time T24 indicate that the memory is ready to execute memory access requests #2, #4, #8, and #10. At this point, the host 120 may decide to execute one or multiple ones of memory access requests #2, #4, #8, and #10.

If the host 120 decides to execute all of the memory access requests that are ready for execution, the host 120, at time T25, may provide an execution command to the memory 140 with indications indicating that the memory should execute memory access requests #2, #4, #8, and #10. The memory 140 responds at time T26 with an acknowledgment that the execution response was safely received and that it will soon begin executing memory access requests #2, #4, #8, and #10. Then, at times T27, T28, T29, and T30, the memory 140 executes the memory access requests #2, #4, #8, and #10 by providing read data to the DATA bus 134, which is received at the host 120. The read data provided by the memory at times T27, T28, T29, and T30 is provided back-to-back and without interruption—e.g., without any intervening execution commands.

As described above, the memory 140 may execute memory access requests #2, #4, #8, and #10 in some particular order. The order in which the memory access requests #2, #4, #8, and #10 are executed may be based on the identification numbers (e.g., numerical execution), or may be determined by the host 120 and/or the memory 140. The execution command provided at time T25, and/or either of the memory responses provided at times T24 or T26 may include order information—such as a suggested or actual order in which the memory 140 should or will execute the plurality of memory access requests identified in the execution command.

After time T30, the host 120 may request additional status information from the memory 140, and if the memory 140 is ready to execute additional memory access requests, the host 120 may provide another execution command to the memory 140

Figure 3B:
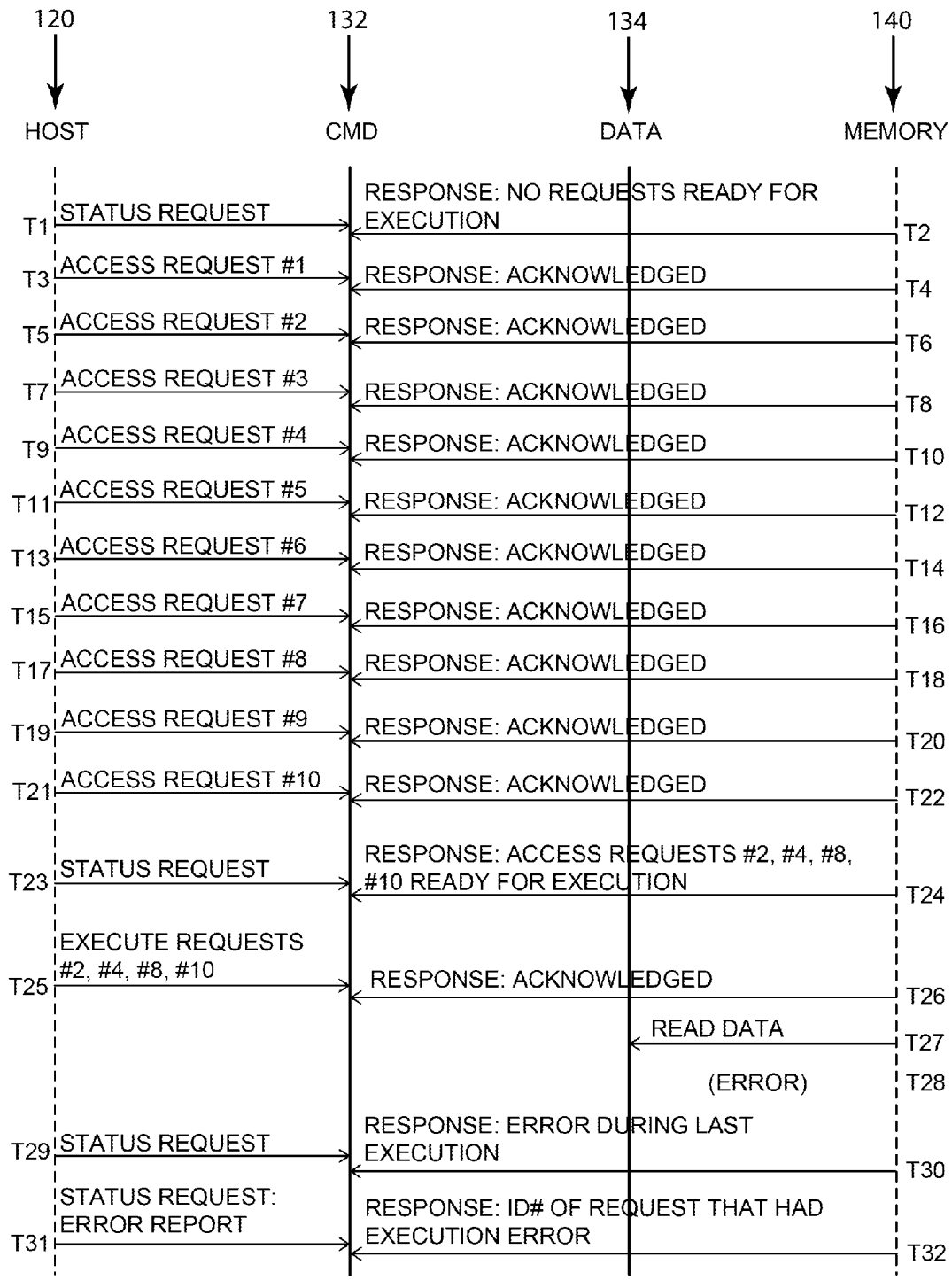
FIG. 3B is a timing diagram illustrating the operation of the apparatus of FIG. 1 according to an embodiment of the invention.

FIG. 3B illustrates another example of operation of the host 120 and memory 140 of the apparatus 100 of FIG. 1. The operation illustrated in FIG. 3B is similar to the operation illustrated in FIG. 3A, except that during execution of one of the memory access requests, an execution error occurs (at time T28). In some embodiments, and as illustrated in FIG. 3B, the memory 140 may stop execution of the plurality of memory access requests once an execution error occurs. In other embodiments, the memory 140 may continue to execute any remaining memory access requests.

The memory 140 may in some embodiments provide an indication to the host 120 that an execution error occurred. For example, in response to a status request provided to the memory 140 at time T29, the memory 140 may respond with an indication of the execution error. In other embodiments, the memory 140 may send the execution error notification to the host 120 via an interrupt or other communication.

The host 120 may in some embodiments request additional information from the memory 140 regarding the execution error. For example, the host 120 may need to know which of multiple ones of memory access requests caused the execution error. In order to obtain this additional information, the host 120 may request an error report from the memory 140, and the memory 140 may respond to the request with the error report. In some examples, the request for the error report may be sent as part of a status request—and the error report may be returned in a format similar to the ready status information provided by the queue status register 152—specifically, a bitmap may be provided with each bit indicating which of the memory access requests caused the execution error.

Figure 4:
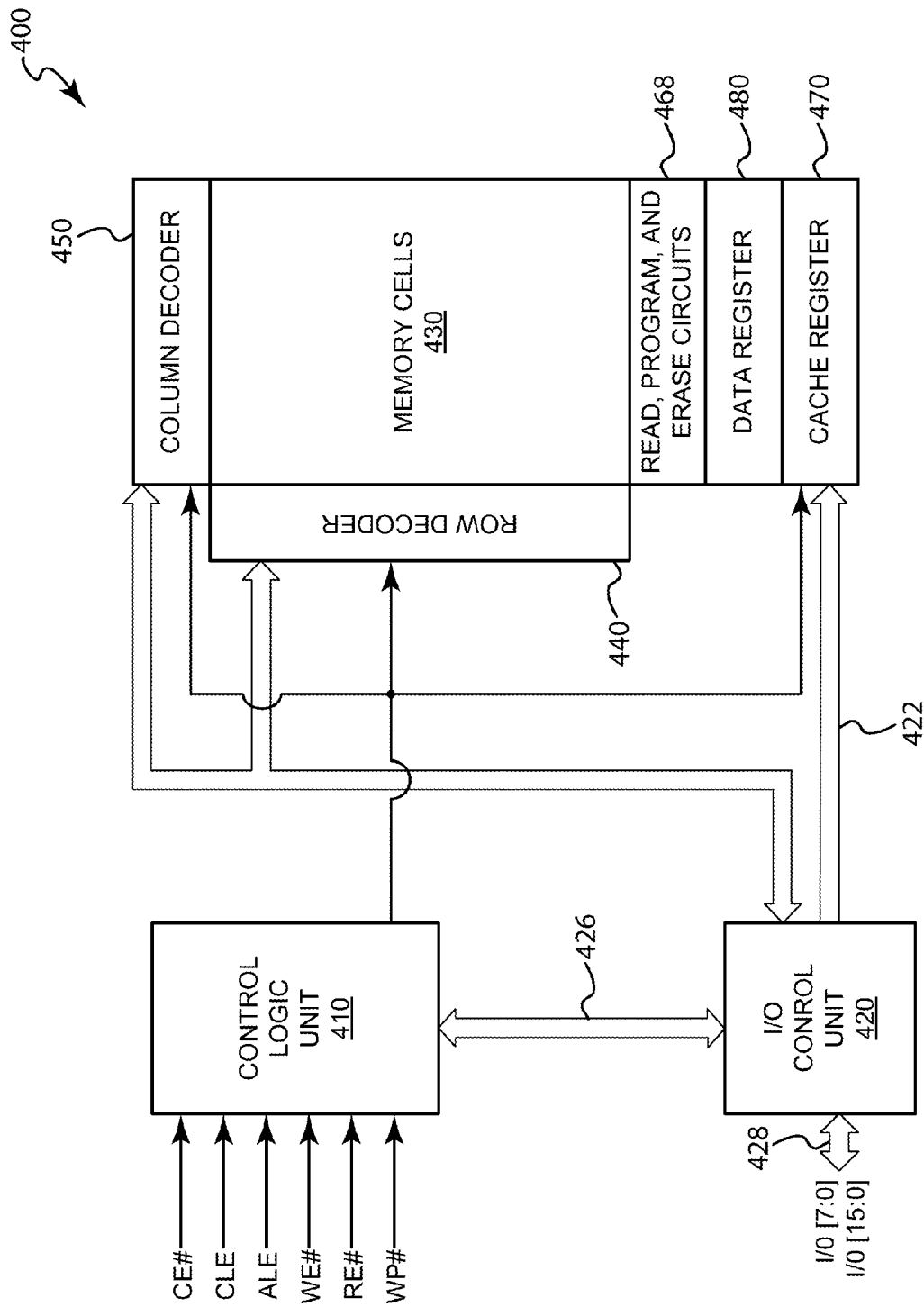
FIG. 4 is a block diagram of a memory array according to an embodiment of the invention.

FIG. 4 illustrates a memory array 400 according to an embodiment of the invention. The memory array 400 may be used as the memory array 144 in the apparatus 100 of FIG. 1 in some examples, and includes a plurality of memory cells 430. The memory cells 430 may be non-volatile memory cells, such as NAND or NOR flash cells, phase change memory cells, or may generally be any type of memory cells.

Command signals, address signals and write data signals may be provided to the memory 400 as sets of sequential input/output ("I/O") signals transmitted through an I/O bus 428. Similarly, read data signals may be provided from the memory 400 through the I/O bus 428. The I/O bus 428 is connected to an I/O control unit 420 that routes the signals between the I/O bus 428 and an internal data bus 422, an internal address bus 424, and an internal command bus 426. The memory 400 also includes a control logic unit 410 that receives a number of control signals either externally or through the command bus 426 to control the operation of the memory 400, and which may generally correspond to the memory controller 142 of the apparatus 100 illustrated in FIG. 1.

The address bus 424 applies block-row address signals to a row decoder 440 and column address signals to a column decoder 450. The row decoder 440 and column decoder 450 may be used to select blocks of memory or memory cells for memory operations, for example, read, program, and erase operations. The row decoder 440 and/or the column decoder 450 may include one or more signal line drivers configured to provide a biasing signal to one or more of the signal lines in the memory array 430. The column decoder 450 may enable write data signals to be applied to columns of memory corresponding to the column address signals and allow read data signals to be coupled from columns corresponding to the column address signals.

In response to the memory commands decoded by the control logic unit 410, the memory cells in the array 430 are read, programmed, or erased. Read, program, and erase circuits 468 coupled to the memory array 430 receive control signals from the control logic unit 410 and include voltage generators for generating various pumped voltages for read, program and erase operations.

After the row address signals have been applied to the address bus 424, the I/O control unit 420 routes write data signals to a cache register 470. The write data signals are stored in the cache register 470 in successive sets each having a size corresponding to the width of the I/O bus 428. The cache register 470 sequentially stores the sets of write data signals for an entire row or page of memory cells in the array 430. All of the stored write data signals are then used to program a row or page of memory cells in the array 430 selected by the block-row address coupled through the address bus 424. In a similar manner, during a read operation, data signals from a row or block of memory cells selected by the block-row address coupled through the address bus 424 are stored in a data register 480. Sets of data signals corresponding in size to the width of the I/O bus 428 are then sequentially transferred through the I/O control unit 420 from the data register 480 to the I/O bus 428.

From the foregoing it will be appreciated that, although specific embodiments of the invention have been described herein for purposes of illustration, various modifications may be made without deviating from the spirit and scope of the invention. For example, FIG. 1 illustrates embodiment of a host 120, a host controller 124, a memory 140, a memory controller 142, a memory array 144, a memory access request queue 150, a queue status register 152, and so forth, FIG. 2A illustrates an embodiment of a queue status register 152, and FIG. 4 illustrates an embodiment of a memory array 400. However, other hosts, host controllers, memories, memory controllers, memory arrays, memory access request queues, queue status registers, and so forth may be used, which are not limited to having the same design, and may be of different designs and include circuitry different from the circuitry in the embodiments illustrated in the figures.

Accordingly, the invention is not limited to the specific embodiments of the invention described herein.

What is claimed is:

1. An apparatus, comprising:
a memory configured to receive from a host a plurality of memory access requests, a status request, and an execution command, and further configured to queue the plurality of memory access requests in a request queue and to execute one or more of the plurality of memory access requests responsive to the execution command from the host;
wherein the execution command comprises a plurality of indications, each of the plurality of indications corresponding to a respective one of the plurality of memory access requests queued in the request queue, and indicating whether the host is requesting the memory to execute the respective one of the plurality of memory access requests.

2. The apparatus of claim 1, wherein each of the plurality of memory access requests is assigned a respective request identification number and, in the event that the execution command indicates that the host is requesting execution of more than one of the plurality of memory access requests, the memory is configured to execute the more than one of the plurality of memory access requests in numerical order according to the respective request identification numbers.

3. The apparatus of claim 1, wherein the memory is configured to determine a suggested execution order and to provide the suggested execution order to the host.

4. The apparatus of claim 3, wherein the memory is configured to provide the suggested execution order to the host together with ready status information in response to the status request.

5. The apparatus of claim 3, wherein the execution command received from the host further comprises an indication of whether the memory should use the suggested execution order.

6. The apparatus of claim 1, wherein the memory is configured to provide an actual execution order to the host in response to the status request, the actual execution order indicating the order in which the memory will execute each of the plurality of memory access requests that the host has requested be executed.

7. The apparatus of claim 6, wherein the memory is configured to provide the actual execution order to the host together with ready status information in response to the status request.

8. The apparatus of claim 1, wherein the memory is further configured to provide an error report to the host responsive to receiving a request for the error report after the occurrence of an execution error.

9. An apparatus, comprising:
a host configured to provide a plurality of memory access requests, a status request, and an execution command to a memory, and to receive ready status information from the memory responsive to the status request, wherein the plurality of memory access requests to be queued in a request queue of the memory;
wherein the host is further configured to provide the execution command responsive to the ready status information, and the execution command comprises a plurality of indications, each of the plurality of indications corresponding to a respective one of the plurality of memory access requests queued in the request queue and indicating whether the host is thereby requesting execution of the respective one of the plurality of memory access requests.

10. The apparatus of claim 9, wherein the execution command is structured such that the host can request that one or multiple ones of the plurality of memory access requests be executed by the memory via the execution command.

11. The apparatus of claim 9, wherein a logic high value for one of the plurality of indications of the execution command corresponds to a request from the host to execute the respective memory access request.

12. The apparatus of claim 9, wherein the host is further configured to determine a suggested execution order and to provide the suggested execution order to the memory.

13. The apparatus of claim 12, wherein the host is configured to receive a response from the memory indicating whether the suggested execution order will be used.

14. The apparatus of claim 9, wherein the host is further configured to determine an actual execution order and to provide the actual execution order to the memory.

15. The apparatus of claim 9, wherein the host is further configured to request an error report from the memory responsive to receiving an indication from the memory that an execution error occurred.

16. A method, comprising:
providing a plurality of memory access requests to a memory to be queued in a request queue of the memory;
requesting ready status information from the memory indicative of whether the memory is ready to execute first and second memory access requests of the plurality of memory access requests queued in the request queue; and
providing an execution command to the memory responsive to the ready status information indicating that both the first and second memory access requests of the plurality of memory access requests queued in the request queue are ready for execution, the execution command comprising first and second indications requesting execution of the first and second memory access requests of the plurality of memory access requests queued in the request queue, respectively.

17. The method of claim 16, wherein the first and second indications requesting execution of the first and second memory access requests are included within a single execution command.

18. The method of claim 16, wherein at least one argument of the execution command is provided in a bitmap format, with each respective bit of the at least one argument corresponding to a respective one of the plurality of memory access requests.

19. The method of claim 16, further comprising requesting an error report responsive to receiving an indication from the memory that an execution error occurred.

* * * * *